July 22, 1947.　　　　W. R. DENT　　　　2,424,437
WELDER'S HEAT GUARD
Filed Sept. 13, 1945
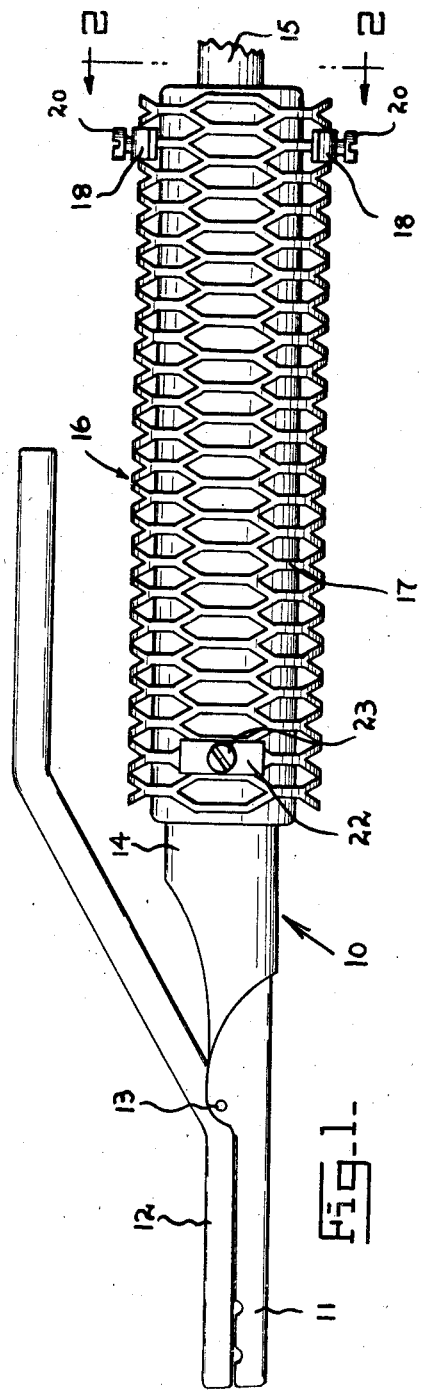
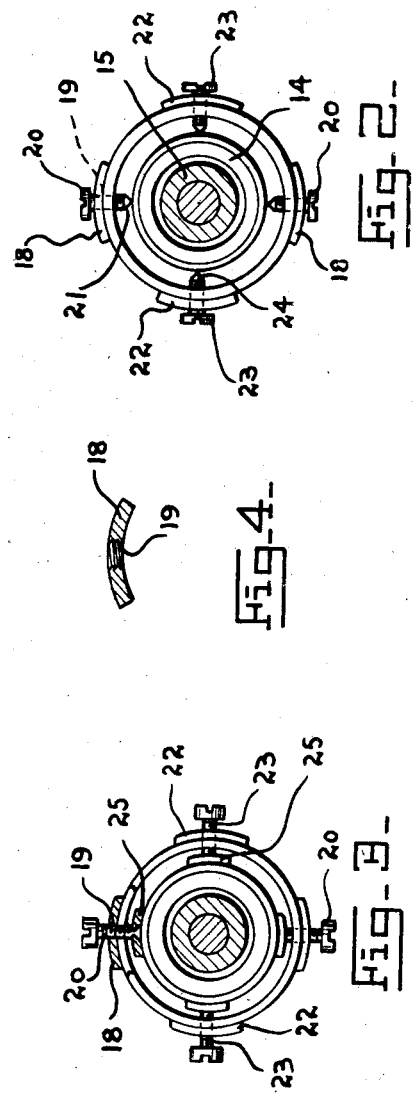
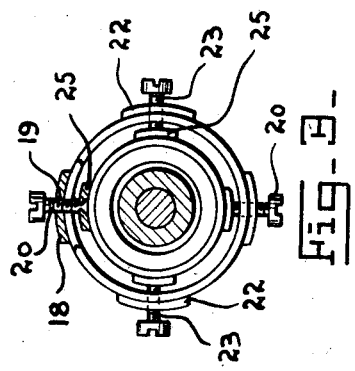
Inventor
WALLACE R. DENT
By *Clarence A. O'Brien and Harvey B. Jacobson*
Attorneys Patented July 22, 1947

2,424,437

UNITED STATES PATENT OFFICE 2,424,437

WELDER'S HEAT GUARD

Wallace R. Dent, Chicago, Ill.

Application September 13, 1945, Serial No. 616,035

2 Claims. (Cl. 16—116)

This invention relates to a welder's heat guard and has for its primary object to protect the hand of a welder from the intense heat generated in the handle of a welding tool when the latter is in use.

Among its features my invention embodies encircling the handle of a welding electrode holder with a heat dissipating grip comprising a foraminous tubular body possessing high thermal-conductivity and means to retain the grip in spaced concentric relation to the handle of the electrode holder.

In the drawing:

Figure 1 is a side view of an electrode holder such as is commonly used in electric welding, showing the same equipped with my improved grip.

Figure 2 is a sectional view taken substantially on the line 2—2 of Figure 1.

Figure 3 is a view similar to Figure 2 showing a modified form of clamping device, and Figure 4 is a sectional view through one of the screw supporting plates.

Referring to the drawing in detail, a welding electrode holder designated generally 10 comprises the usual stationary jaw 11 to which a movable jaw 12 is pivoted as at 13. The stationary jaw 11 terminates at one end in a handle 14 through which the usual welding cable 15 extends longitudinally in a conventional manner. In the use of such a tool the handle 11 after a reasonably short time becomes so heated that injury to the welder's hands result, particularly when welding rods of the larger sizes are being employed and through the use of the invention to be more fully set forth in detail, not only much discomfort to the welder can be dispensed with but danger of permanent injury can be avoided.

My invention embodies a grip designated generally 16 formed of a tubular body 17 of foraminous material of relatively high thermal-conductivity. In actual practice, I find it advantageous to form the grip 16 from a material commonly known on the market as expanded metal, and welded or otherwise secured near one end of the tubular body 17 I provide diametrically opposed plates 18 which are internally screw threaded as at 19 to receive the threaded shank of radially extending screws 20 the ends of which are pointed as at 21 to bite into the surface of the handle 14. Adjacent the opposite end of the tubular body 17 I provide similar plates 22 which are arranged diametrically opposite one another but are turned so that the axes of the internally screw threaded apertures 19 therein lie on an axis which is perpendicular to the axes of the screws 20 in the plates 18. The plates 22 are adapted to receive screws 23 the ends of which are pointed as at 24 so as to engage and bite into the surface of the handle 14. It will thus be seen that the grip 16 is supported in spaced concentric relation about the handle 14 so as to allow the circulation of air between its inner side and the handle, and due to the fact that the material from which it is made possesses high thermal-conductivity, it will be evident that the heat absorbed in any part will be rapidly dissipated into the surrounding atmosphere.

In the modification illustrated in Figure 3, the inner ends of the screws 20 and 23 instead of being pointed as at 21 and 24 in Figure 2 are preferably provided with curved gripping plates 25 to form clamp jaws for engaging the handle 14 to hold the grip 16 in concentric relation thereto.

While in the foregoing there has been shown and described the preferred embodiment of this invention it is to be understood that minor changes in the details of construction, combination and arrangement of parts may be resorted to without departing from the spirit and scope of the invention as claimed.

What I claim is:

1. A heat dissipating grip for welding tools comprising a tube of foraminous material possessing high thermal conductivity, internally screw threaded nuts secured adjacent opposite ends of the grip and screws entering the nuts and adapted to engage the handle of a welding tool to hold the grip thereon in spaced concentric relation therewith.

2. As a new article of manufacture, a heat dissipating grip for attachment to the handle of a welding electrode holder comprising a tubular body of foraminous material possessing high thermal conductivity, radially spaced nuts secured to the body adjacent opposite ends, screws threadedly engaging the nuts and extending radially through the tube for engagement with the handle of a welding torch detachably to hold the tubular body in spaced concentric relation to the handle.

WALLACE R. DENT.

REFERENCES CITED

The following references are of record in the file of this patent:

UNITED STATES PATENTS

| Number | Name | Date |
|---|---|---|
| 1,942,493 | Reith | Jan. 9, 1934 |
| 2,094,121 | Harvey | Sept. 28, 1937 |